United States Patent [19]
Schubert et al.

[11] Patent Number: 5,702,622
[45] Date of Patent: Dec. 30, 1997

[54] TERMINAL HEAD FOR PROCESSING A WORKPIECE BY MEANS OF A LASER BEAM

[75] Inventors: Peter Schubert, Gaggenau; Hubert Adamiak, Baden-Baden, both of Germany

[73] Assignee: PRECITEX GmbH, Gaggenau-Bad Rotenfels, Germany

[21] Appl. No.: 637,903

[22] Filed: Apr. 26, 1996

[30] Foreign Application Priority Data

Apr. 28, 1995 [DE] Germany .................. 295 07 189 U

[51] Int. Cl.$^6$ .................................................. B23K 26/00
[52] U.S. Cl. ........................... 219/121.75; 219/121.6
[58] Field of Search .................. 219/121.6, 121.75, 219/121.67; 359/809, 813, 825, 829

[56] References Cited

U.S. PATENT DOCUMENTS

| | | | |
|---|---|---|---|
| 4,324,972 | 4/1982 | Furrer et al. | 219/121.75 |
| 4,896,944 | 1/1990 | Irwin et al. | 219/121.75 |

FOREIGN PATENT DOCUMENTS

| | | | |
|---|---|---|---|
| 3814985 | 12/1988 | Germany | 219/121.75 |
| 58-103993 | 6/1983 | Japan | 219/121.75 |
| 62-199281 | 9/1987 | Japan | 219/121.75 |
| 63-264291 | 11/1988 | Japan | 219/121.75 |
| 63-268587 | 11/1988 | Japan | 219/121.75 |
| 5-8070 | 1/1993 | Japan | 219/121.61 |

*Primary Examiner*—Teresa J. Walberg
*Assistant Examiner*—Gregory L. Mills
*Attorney, Agent, or Firm*—Birch, Stewart, Kolasch & Birch, LLP

[57] ABSTRACT

A terminal head for processing a workpiece using a laser beam includes a housing into which an insert including a focusing optical system is laterally inserted. The terminal head includes a positioning device accessible from outside of the housing for displacing the focusing optical system relative to the insert. The adjusting device may displace the focusing optical system in a longitudinal direction of a laser beam and at right angles to the longitudinal direction of the laser beam. This arrangement allows the focusing optical system to be readily changed and properly adjusted within the housing.

12 Claims, 2 Drawing Sheets

TERMINAL HEAD FOR PROCESSING A WORKPIECE BY MEANS OF A LASER BEAM

The invention relates to a terminal head for processing a workpiece by means of a laser beam.

BACKGROUND OF THE INVENTION

A prior art terminal head has a housing and an insert, which can be inserted laterally into the housing and has a focussing optical system for focussing the laser beam.

The focussing optical system and insert are permanently connected to one another, with the result that it is virtually no longer possible to align the focussing optical system relative to the laser beam after introduction of the insert into the housing. In the case of different focal lengths of the focussing optical system, it is impossible, furthermore, to displace the position of the focal point of the system in the longitudinal direction of a laser beam in order to align the focal point of the focussing optical system relative to the tip of a nozzle which is located at the end of a housing on the side where radiation is output and through which the laser beam passes.

SUMMARY OF THE INVENTION

It is the object of the invention to develop the terminal head of the type mentioned at the beginning in such a way that a better possibility is provided for positioning the focussing optical system.

A terminal head according to the invention differs from the prior art in that the focussing optical system can be displaced relative to the insert via positioning means which are partly situated on the outwardly pointing side of the insert.

If it is necessary to replace a focussing optical system by another having the same or different optical properties, either a new insert with the desired focussing optical system can be inserted into the housing, or the old insert can be used with a new focussing optical system inserted into it. In both cases, a simple adjustment of the focussing optical system relative to the laser beam is possible. Specifically the adjusting means permits adjustment of the focussing optical system even when the insert has already been reinserted into the housing. The positioning of the focussing optical system can thus be undertaken when a laser beam is present, and can therefore be performed in a decidedly precise fashion.

The adjusting means can be designed for displacing the focussing optical system in the longitudinal direction of a laser beam in order, for example, to be able to position the focal point of the focussing optical system relative to the tip of a nozzle which is connected to the end of the housing on the side where radiation is output and through which the laser beam passes.

The adjusting means can also be designed for displacing the focussing optical system at right angles to the longitudinal direction of the laser beam, in order to make the center of the focussing optical system and the center of the beam coincide.

According to a very advantageous refinement of the invention, the insert can be positioned inside a larger opening of the housing at an axial position by means of an adaptor plate which can be connected to the housing. The adapter plate has a recess at this axial position which accommodates the insert in a fitted fashion.

If very strongly mutually deviating focal lengths of the focussing optical system are required because of a desired type of material to be processed or because of prescribed thicknesses of material to be processed, the focal lengths must be arranged at axial positions in the housing which are situated far removed from one another if the focal point of the focussing optical system is to retain its original position relative to the end of the housing on the side where radiation is output or relative to the nozzle.

For this purpose, a relatively large opening is located in the housing which permits positioning of the insert at different axial positions of the housing. In order to be able to fix the insert at one such axial position, provision is made of an adaptor plate which covers the housing opening and has precisely at this axial position a recess for accommodating the insert. If the insert is to be positioned at a different axial position, use must be made of a different adaptor plate which is equipped with a recess present at this axial position.

The respective adaptor plates which cover the housing opening can be attached to the housing by clamping screws, for example, just like the insert seated in the recess, in the last-mentioned case the clamping screws being present on the adaptor plate.

According to a refinement of the invention, the adjusting means for displacing the focussing optical system in the longitudinal direction of the laser beam includes a rotatable adjusting ring situated coaxially with the longitudinal direction of the laser beam. This adjusting ring projects forward over a portion of its circumference through the front plate of the insert, with the result that it can be operated even if the insert is inserted into the housing. By rotating the adjusting ring, it is therefore possible to displace the focussing optical system in the longitudinal direction of the laser beam.

The adjusting ring is advantageously permanently connected to an adjusting cylinder which has an external thread onto which a cylindrical lens is threaded which is secured against rotation and supports the focussing optical system. Thus, upon rotation of the adjusting cylinder via the adjusting ring the cylindrical lens holder is moved to and fro in the longitudinal direction of the laser beam, depending on the direction in which the adjusting ring is rotated.

According to a very advantageous development of the invention, the adjusting cylinder has axial through channels, the axial through channels opening into a coaxial annular channel which is present in the adjusting cylinder and faces the focussing optical system. This annular channel is connected via an annular restrictor to a space present above the focussing optical system, with the result that compressed air fed via the through channels can expand because of the annular restrictor and effectively cool the focussing optical system situated below it.

According to a refinement of the invention, the cylindrical lens holder can be displaced in a fitted fashion in a guide sleeve on which the adjusting ring is supported. In this case, the adjusting ring rests on the surface of the guide sleeve on the side where radiation is input. It is held there free from play in the axial direction of the guide sleeve.

According to a further advantageous refinement of the invention, the guide sleeve is mounted in a fixed axial position on the rear of a front plate of the insert so as to be capable of pivoting about a spindle which extends at a spacing parallel to the longitudinal direction of the laser beam. It is possible in this arrangement for this spindle to be permanently connected to the guide sleeve and guided in a laterally fitted fashion between limbs which project from the rear of the front plate. Consequently, on the one hand it is possible to pivot the guide sleeve, and with it the focussing optical system, about the spindle. On the other hand, it is also possible to displace the guide sleeve at right angles to the longitudinal direction of the laser beam, since the spindle can also be displaced between the limbs, which extend parallel to one another and have a mutual spacing which corresponds to the diameter of the spindle.

Furthermore, according to an advantageous development of the invention the guide sleeve is drawn against the rear of the front plate with the aid of springs. The springs may be guided around the guide sleeve, for example, and fastened with their ends to the rear of the front plate.

The adjusting means for the planar displacement of the focussing optical system can then project through the front plate, and may comprise screws. There are preferably present two screws which lie in the plane at an angle relative to one another, which are respectively aligned with the centre of the laser beam. Accommodated between the screws is the spindle about which the guide sleeve can pivot.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
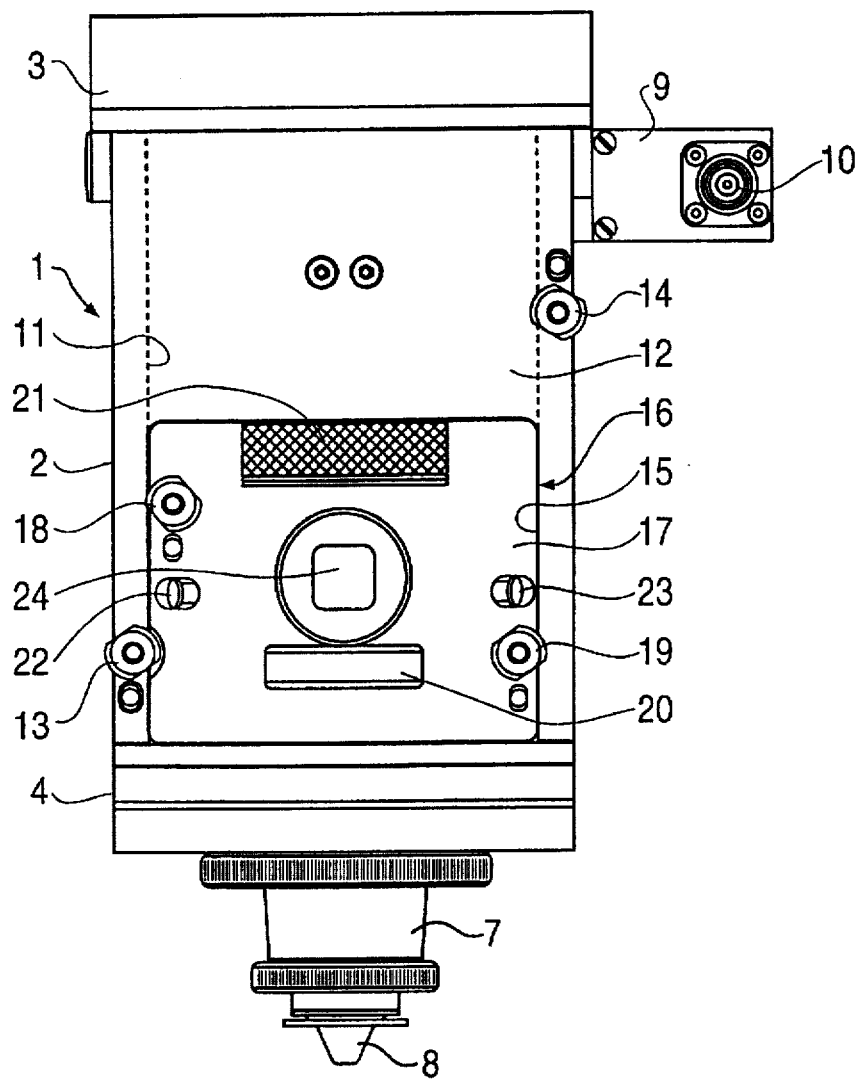
FIG. 1 shows a view of the front of a terminal head according to the invention including an insert.

FIG. 1 shows the front of the terminal head according to the invention, which is provided with the reference numeral 1. This terminal head 1 includes a housing 2 which is sealed above and below by covers 3 and 4. As may be seen from FIG. 2, the upper cover 3 has a central opening 5 through which a laser beam (not represented) enters into the terminal head 1. The cover 3 is fastened to the housing 2 by screws 6. Fastened to the underside of the cover 4 is a nozzle electrode 7 which carries at its tip a sensor electrode 8 with the aid of which a spacing between the terminal head I and the workpiece to be processed can be measured in a capacitive way. In this case, the laser beam passing through the terminal head 1 traverses the nozzle 7 and the sensor electrode 8 in order to impinge on the workpiece. Applied to the nozzle electrode 8 is a sensor potential which is fed via an electrical connection 9 with a coaxial connector 10. In this arrangement, the terminal head 1 is at earth potential, screen potential or a DC potential which can be used to detect a collision. Further, feed lines for cooling or cutting gases are located on top or at the sides of the terminal head I and will not be explained further here.

As may be seen from FIG. 1, there is located on the front of the housing 2 an opening 11 which is of rectangular construction and extends over the entire height of the housing 2. This opening 11 is sealed tight by an adaptor plate 12 which, for its part, is permanently screwed to the housing 2 with the aid of clamping screws 13 and 14. The clamping screws 13 and 14 project through the adaptor plate 12 and are screwed into side walls of the housing 2.

Located in the lower region of the adaptor plate 12 is a recess 15 through which an insert 16 is inserted in a fitted and sealing fashion into the housing 2. This insert 16 has a front plate 17 which is seated in a fitted fashion in the recess 15. In this arrangement, the insert 16 is secured against falling out of the housing 2 by the clamping screw 13. In order to prevent the insert 16 from being pushed too far into the housing 2, there are present on the front plate 17 further positioning screws 18 and 19 which are screwed into the front plate 9 and strike against the front of the adaptor plate 12 with their head.

As will be described, the insert 16 includes a focussing optical system and can be positioned as required at different heights or axial positions in the housing 2. This requires the use of an adaptor plate 12 which has a corresponding recess 15 at the desired axial position.

Located on the front of the front plate 17 of insert 16 is a handle 20 with the aid of which the insert 16 can be extracted from the housing 2. Furthermore, an adjusting ring 21, which is situated coaxially with the longitudinal direction of a laser beam and can be rotated by hand in one direction or the other, is accessible via the front plate 17. The adjusting ring 21 has a kurled area on its outer circumferential surface for this purpose. Moreover, adjusting screws 22 and 23 which serve the purpose of planar adjustment of the focussing optical system which is borne by the insert are screwed into the front plate 17. By rotating one or both adjusting screws 22, 23, the focussing optical system can be displaced in a plane at right angles to the longitudinal direction of the laser beam. A window 24 in the front plate 17 is used to read off the height of the focussing optical system which, for this purpose, can be provided with a suitable marking. A scale (not represented) can be located at the window 24.

Figure 2:
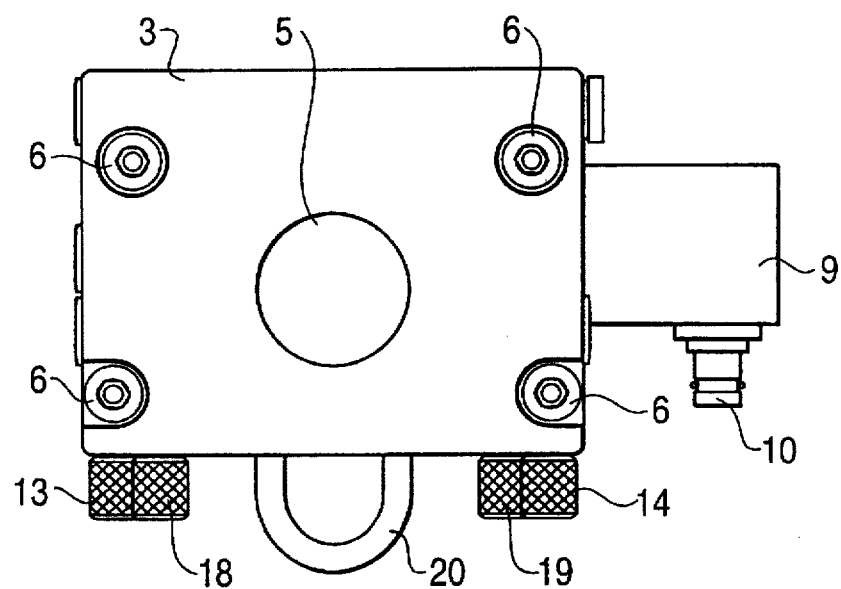
FIG. 2 shows a top view of the terminal head according to FIG. 1.
Figure 3:
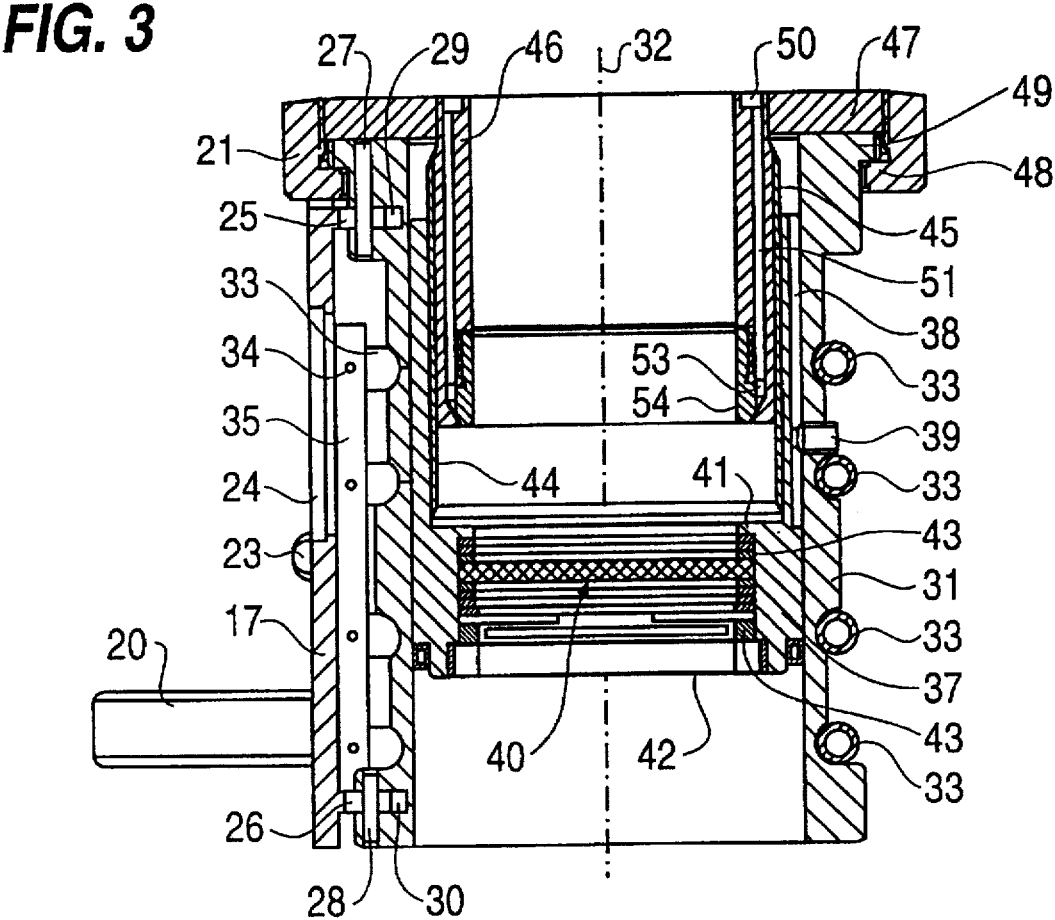
FIG. 3 shows an axial section of the terminal head.
Figure 4:
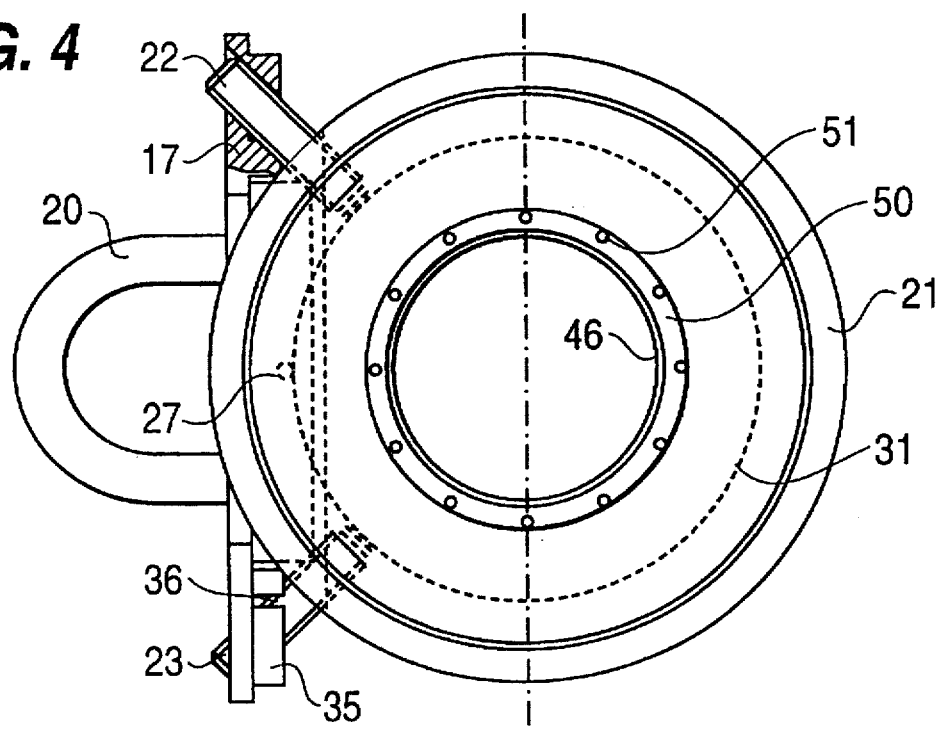
FIG. 4 shows a top view of the insert according to FIG. 3.

FIGS. 3 and 4 respectively show the insert in axial section and top view. Identical elements to those in FIGS. 1 and 2 are provided in this case with identical reference numerals.

In accordance with FIG. 3, the front plate 17 has on its rear two projections 25 and 26 which are essentially of U-shaped construction and have two limbs which extend parallel to one another and whose opening points away from the front plate 17. These projections 25 and 26 can be connected in one piece with the front plate 17. One is located on the upper end of the front plate, the other being located on the lower end of the front plate. A pin 27 or 28 is respectively guided between two limbs of a respective projection 25, 26. The spacing of the two limbs, extending parallel to one another, of a respective projection 25, 26 corresponds in this case to the diameter of the pin 27, 28 respectively guided between the limbs. The pins 27, 28 can thus be displaced between the limbs, but can also rotate, specifically about their longitudinal axis.

The projections 25, 26, or limbs respectively engage in horizontal slits 29, 30, which are located in a portion of the circumferential wall of a guide sleeve 31. The pins 27, 28 pass vertically through these horizontal slits 29, 30, the pins 27, 28 themselves being permanently inserted in the respectively top and bottom wall region of the guide sleeve 31. The centre line of the guide sleeve 31 is provided in FIG. 3 with the reference numeral 32. This centre line 32 extends in the longitudinal direction of the laser beam, it thus being the case that the laser beam should be situated coaxially with the centre line 32. The pins 27, 28 extend parallel to the centre line 32, while the respective limbs of the projections 25, 26, and also the slits 29, 30, are respectively situated at right angles to the centre line 32. In this arrangement, the limbs of the projections 25, 26 are guided in the horizontal slits 29, 30 free from play when seen in the vertical direction, that is to say any direction parallel to the centre line 32. The guide sleeve 31 therefore cannot be displaced in the longitudinal direction of the centre line 32. Rather, the guide sleeve 31 can be displaced only in a plane at right angles to the centre line 32, or can be rotated about the pins 27, 28.

The guide sleeve 31 is drawn against the rear wall of the front plate 17 with the aid of springs 33. The springs 33 are laid in this arrangement around the guide sleeve 31 and fastened with their ends to pins 34 which are located inside a web 35 which is fastened to the rear of the front plate 17. Only one of these webs 35 is to be seen in FIG. 3, while the second of the webs 35 can be seen at the bottom of FIG. 4. The ends of the springs 33 are inserted into slits 36 inside the webs 35, the pins 34 being situated inside these slits 36. The pins 34 are not represented in FIG. 4, for the sake of clarity.

With the aid of the adjusting screws 22, 23 already mentioned, the guide sleeve 31 can now be displaced in a plane at right angles to the centre line 32 against the force of the springs 33. In this process, the pins 27 and 28 can likewise be displaced in the region between the respective limbs of the projections 25, 26, or can rotate about their longitudinal axis. In the top view in FIG. 4, the pin 27 is to be seen below which and coaxially with which the pin 28 is situated. The adjusting screws 22, 23 project obliquely through the front plate 17 and are screwed in threaded through bores which are located in the front plate 17. The adjusting screws 22, 23 can, for example, be grub screws, and are aligned such that they extend at 45° relative to one another and are aligned essentially with the centre of the guide sleeve 31. They strike with their front positioning surfaces against the circumferential wall of the guide sleeve 31.

The guide sleeve 31 is of cylindrical internal construction and accommodates in a fitted fashion a cylindrical lens holder 37 which can be displaced in the longitudinal direction of the guide sleeve 31. This lens holder 37 is secured against rotation, for which purpose it has on its outer circumference an axial slit 38 into which a radial securing element 39 engages, for example a grub screw which is screwed into a threaded bore inside the circumferential wall of the guide sleeve 31.

The lens holder 37 itself is likewise designed in a hollow cylindrical fashion and accommodates a focussing optical system 40 in its lower part. This focussing optical system 40 can include one or more lenses and is inserted from below into a correspondingly enlarged opening in the lens holder 37. On the circumferential side, the focussing optical system 40 rests on a corresponding shoulder 41 of the lens holder 37. In order to secure the focussing optical system 40 in the lens holder 37, it is possible to screw into the latter a securing ring 42 which is situated coaxially with the centre line 32 and via its end face presses the focussing optical system 40 against the shoulder 41. The focussing optical system 40 can also have additional spacer rings 43 for the purpose of positioning lenses.

The focussing optical system 40 can be displaced with the lens holder 37 in the longitudinal direction of the centre line 32, since the axial slit 38, into which the securing element 39 engages, permits such a displacement. In order to achieve this, the lens holder 37 is provided in its upper hollow cylindrical region with an internal thread 44 into which an adjusting cylinder 46 is screwed via an external thread 45. The external thread 45 is located on the outer circumferential surface of the adjusting cylinder 46. On its upper end or end on the side where radiation is input, this adjusting cylinder 46 has a horizontal flange 47 with which it is connected in one piece. This horizontal flange 47 rests on the end face of the guide sleeve 31 on the side where radiation is input and is connected on its external circumferential rim with the adjusting ring 21 situated coaxially with it. On its lower side, this adjusting ring has an inwardly pointing projection 48 by means of which it grips a circumferential flange 49 of the guide sleeve 31 from behind. It is achieved in this way that the adjusting ring 21 and adjusting cylinder 46 and horizontal flange 47 cannot move in the axial direction of the guide sleeve 31. For reasons of process engineering, the adjusting ring 21 and horizontal flange 47 are screwed to one another, following which they are permanently connected to one another, for example by means of securing pins or bonding. Elements 46, 47 and 21 thus form one part.

If the adjusting ring 21 is rotated, it drives the adjusting cylinder 46 correspondingly via the horizontal flange 47, which because of the engagement of the parts 47 and 45 leads to an axial displacement of the lens holder 37. Depending on the direction of rotation of the adjusting ring 21, the lens holder 37 and, with it, the focussing optical system 40 is displaced upwards or downwards. The adjusting ring 21 does not in this case touch the front plate 17 and can therefore be displaced relative to the latter, specifically with the displacement of the guide sleeve 31 via the adjusting screws 22, 23.

Located in the upper region of the adjusting cylinder 46, that is to say on its end face on the side where radiation is input, is a circumferential channel 50 which is situated coaxially with the centre line 32 and into which a pressurised, gaseous cooling medium is introduced. This circumferential channel 50 is connected to axial channels 51 which are located in the wall of the adjusting cylinder and open into an annular channel 53 which is located in the end of the adjusting cylinder 46 in the side where radiation is output. This annular channel 53 is also coaxial with the centre line 32. It is open in the direction of the centre line 32 and tapers in the direction of the end of the adjusting cylinder 46 on the side where radiation is output. Screwed into this end of the adjusting cylinder 46 is a sleeve 54 whose external wall region closes the annular channel 53 as far as possible in the radial direction, a small annular gap forming a restrictor remaining only in the axial direction. The pressurised gaseous medium then exits through this annular restrictor from the annular channel 53, in which case it expands and cools in order to then impinge on the surface of the focussing optical system 40 on the side where radiation is input. The focussing optical system 40 can be effectively cooled in this way.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A terminal head for processing a workpiece with a laser beam, comprising:
   a housing;

an insert insertable laterally into the housing, said insert including a focussing optical system for focussing the laser beam; and adjusting means accessible from outside of the housing for displacing the focussing optical system relative to the insert, wherein the adjusting means displaces the focussing optical system in a longitudinal direction of the laser beam, wherein the adjusting means includes a rotatable adjusting ring situated coaxially with the longitudinal direction of the laser beam, and wherein the adjusting ring is permanently connected to an adjusting cylinder which has an external thread onto which there is screwed a cylindrical lens holder which is secured against rotation and bears the focussing optical system.

2. The terminal head according to claim 1, wherein the adjusting means displaces the focussing optical system at right angles to the longitudinal direction of the laser beam.

3. The terminal head according to claim 1, wherein the adjusting cylinder includes a plurality of axial through-channels.

4. The terminal head according to claim 3, wherein the axial through-channels open into a coaxial annular channel formed in the adjusting cylinder and is connected via an annular restrictor to a space above the focussing optical system.

5. The terminal head according to claim 1, wherein the cylindrical lens holder is displaceable in a fitted fashion in a guide sleeve on which the adjusting ring is supported.

6. The terminal head according to claim 5, wherein the guide sleeve is mounted in a fixed axial position on a front plate of the insert for pivotal movement about a spindle which extends at a spacing parallel to the longitudinal direction of the laser beam.

7. The terminal head according to claim 6, wherein the spindle is permanently connected to the guide sleeve and guided in a laterally fitted fashion between limbs which project from a rear portion of the front plate.

8. The terminal head according to claim 7, wherein the guide sleeve is drawn against the rear portion of the front plate with the aid of springs.

9. The terminal head according to claim 8, wherein the springs are guided around the guide sleeve and are fastened with their ends to the rear portion of the front plate.

10. The terminal head according to claim 6, wherein the adjusting means includes screws which project through a front plate of the insert and lie in a plane at an angle to one another and accommodate the spindle between them.

11. A terminal head for processing a workpiece with a laser beam, comprising:

a housing;

an insert insertable laterally into the housing, said insert including a focussing optical system for focussing the laser beam; and positioning means accessible from outside of the housing for displacing the focussing optical system relative to the insert, wherein the insert is positioned inside of a larger opening of the housing at an axial position by means of an adapter plate which can be connected to the housing, and has at this axial position a recess which accommodates the insert in a fitted fashion.

12. The terminal head according to claim 11, wherein the insert is fixed in the recess by clamping screws which are located on the adaptor plate.

* * * * *

UNITED STATES PATENT AND TRADEMARK OFFICE
CERTIFICATE OF CORRECTION

PATENT NO. : 5,702,622
DATED : December 30, 1997
INVENTOR(S) : Schubert et al.

It is certified that error appears in the above-indentified patent and that said Letters Patent is hereby corrected as shown below:

On the title page, item [73] Assignee name should read

--PRECITEC GmbH--.

Signed and Sealed this

Twenty-first Day of July, 1998

*Attest:*

*Attesting Officer*

BRUCE LEHMAN

*Commissioner of Patents and Trademarks*